UNITED STATES PATENT OFFICE.

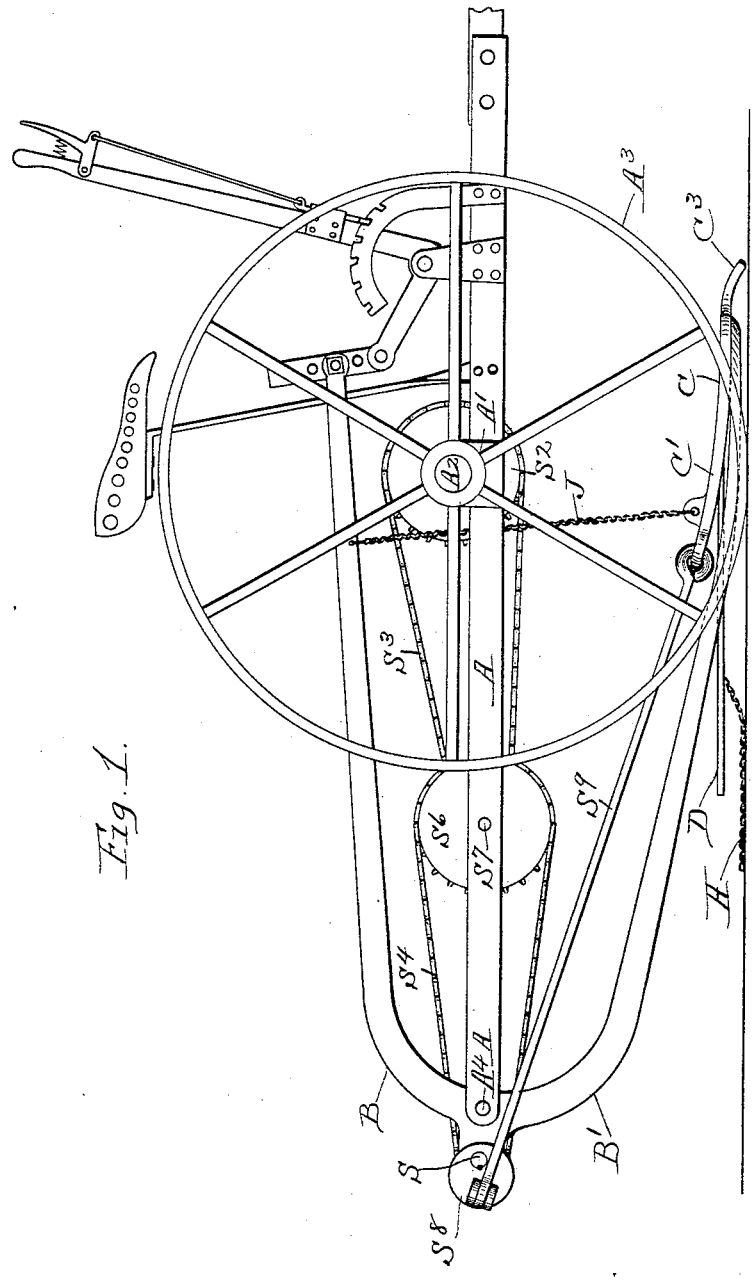

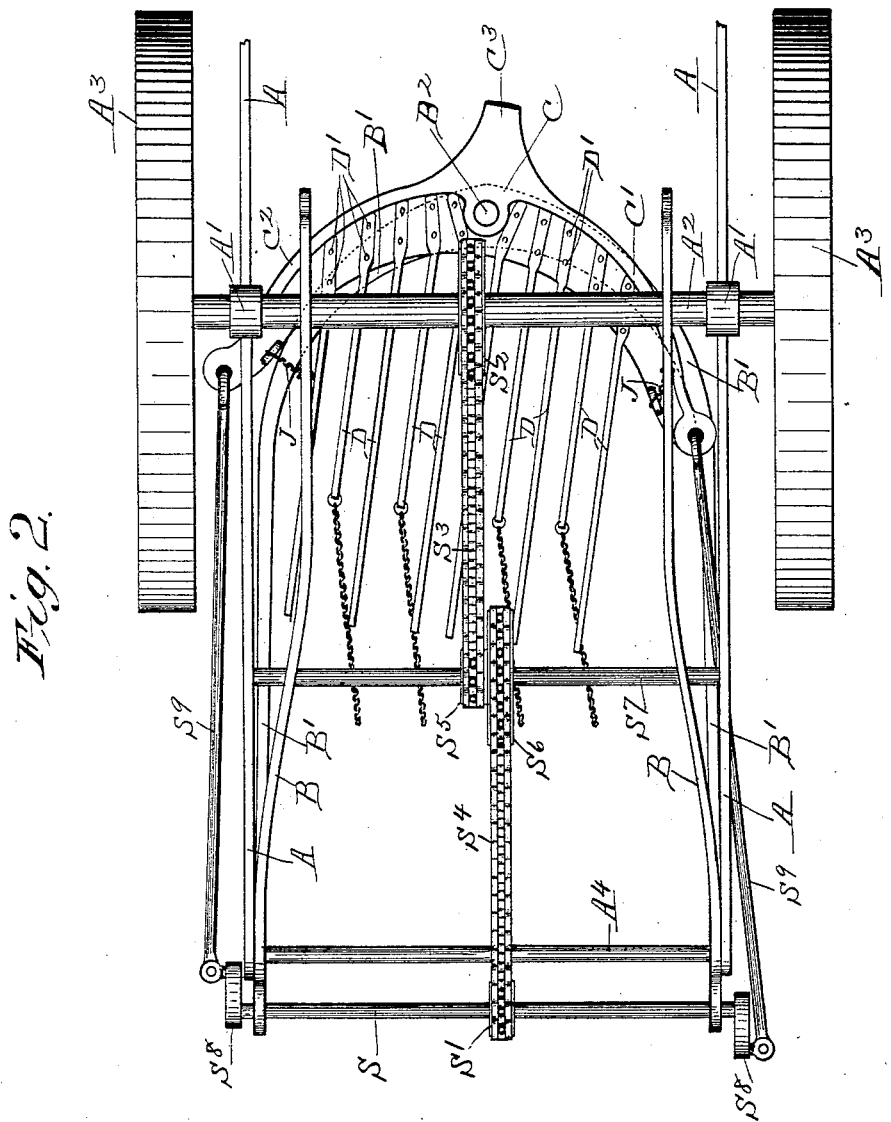

JAMES A. BUCK, OF CRESCENT, NEW YORK, ASSIGNOR OF ONE-HALF TO LE ROY VERMILYEA, OF COHOES, NEW YORK.

POTATO-DIGGER.

SPECIFICATION forming part of Letters Patent No. 602,497, dated April 19, 1898.

Application filed January 7, 1897. Serial No. 618,289. (No model.)

*To all whom it may concern:*

Be it known that I, JAMES A. BUCK, a citizen of the United States, residing at Crescent, county of Saratoga, and State of New York, have invented certain new and useful Improvements in Potato-Diggers, of which the following is a specification.

The invention relates to improvements in potato-diggers; and it consists of the novel construction and combination of parts hereinafter described and subsequently claimed.

Reference may be had to the accompanying drawings, and the letters of reference marked thereon, which form a part of this specification.

Similar letters refer to similar parts in both figures of the drawings.

Figure 1 of the drawings is a view in side elevation of my improved potato-digger with the forward portion of the guiding-pole broken away. Fig. 2 is a top plan view of the same with the elevating mechanism and seat detached.

The truck-frame A is supported by suitable bearing-boxes $A'$ on the axle $A^2$, fixed in the truck-wheels $A^3$. The plow-beam is in the form of a yoke, having the upper member B and the lower member $B'$. The beam is fulcrumed at the junction of these members upon the cross-rod $A^4$, forming a part of the truck-frame. The beam comprises two similar side members, which diverge rearwardly from the forward end of the lower member, as seen in Fig. 2. At this forward part of the lower member is erected a vertical stud or pivot $B^2$, upon which is pivoted the plowshare C. The share is composed of two wings $C'$ and $C^2$, and a tusk $C^3$. The pivot is located intermediately or at the junction of the two wings and just back of the tusk.

As a means for communicating oscillating movements to the share I provide a crank-shaft S, rotary in bearings in the rear ends of the side members of the beam and provided with a sprocket-wheel $S'$, fixed thereon. This sprocket-wheel is connected with a larger sprocket-wheel $S^2$, fixed on the truck-axle, by means of the sprocket-chains $S^3$ and $S^4$ and intermediate sprocket-wheels $S^5$ and $S^6$, supported by the cross bar or shaft $S^7$.

Each end of the crank-shaft supports a crank $S^8$, which is connected by a pitman $S^9$ to one of the wings of the plowshare, as shown, so that the wings and tusk of the plowshare are caused to vibrate rapidly by the forward movement of the truck.

The wings of the share are each provided with rearwardly-projecting tines D, fixed thereon, as by rivets $D'$.

The oscillating movements of the tusk and wings serve to assist the plow in its forward movement through the soil, and its shear movement causes it to more easily cut off obstructing roots of weeds or other growths.

The tines, being given a lateral oscillatory movement, force the potatoes to the top of the soil and leave them on the surface of the ground.

If the pivot $B^2$ formed the sole support for the shares, it would quickly wear away or break.

I have ascertained that an auxiliary support may be provided which will greatly reduce the wear and strain upon the moving parts and prolong the life of the machine. Such support is preferably a link connection between the upper member of the plow-beam and the shares at points in rear of the share-pivot. I have shown such a connection in the form of a pair of chains J, with their upper ends connected with the upper member B and their lower ends respectively with the wings of the plow-share at the rear part of the wings, so that the iron or casting forming the wings and tusk, together with the projecting tines, taken as a whole, are approximately balanced upon the chains and almost wholly supported thereby. The chains, being of considerable length, afford slight resistance to the oscillating movements of the shares and tines.

When desired, some or all of the tines may be provided with drag-chains, secured at one end to the rear end of the tines, to reduce or modify the action of the tines upon the potatoes. Several of the tines are shown provided with such drag-chains H.

Any known means may be employed for imparting oscillating movements to the plow-share. In the means shown the sprocket-wheels are proportioned to cause the crank-shaft to rotate much more rapidly than the truck-axle, and I have secured successful results by having the proportions such as to cause approximately two complete oscillating movements of the plow-share for each foot of advance movement of the machine.

I am aware that it has been proposed to provide a potato-digger with a sifter by suspending its forward end from the truck-frame by means of a swivel connection and its rear end by an oscillatory link connection and to provide the sifter with a plow on its forward end, and I do not broadly claim such construction. If the swivel connection is located at the upper part of the frame at a considerable height from the ground, the thrust force of the plow would produce a binding friction and soon wear out or break the swivel connection, and if draft-chains are employed, as has been proposed, the draft strain will interfere with and impede the proposed oscillating movements of the sifter, and very little, if any, vibratory movement would be imparted to the plow itself, as it is proposed to produce the vibratory movements by the application of power through a crank-and-pitman connection with the extreme rear end of the flexible sifter.

In my improved construction the plow is composed of two shares or wings which run back a considerable distance from the point or tusk and to the rear of the pivot. The plow-beam runs down to the ground beneath the plow, which rests upon and covers the forward end of the beam. The pivotal or swivel connection is a rigid stud erected from the beam and passed up through the plow intermediately of the wings and just back of the tusk. The pivotal connection is thereby located in the same plane with the plowshares, thereby reducing the strain upon the pivot to a minimum and distributing the friction and wear more evenly upon the pivot-bearings. As a further aid in securing an even distribution of the friction I attach the oscillatory chains, which aid in supporting the plow and its attachments, to the shares or wings and at the center of gravity of the plow and its attachments, so that normally the plow is balanced in a horizontal position and the pivot relieved of all friction except that due to the thrust of the plow and its oscillatory movements, which is very little, provided the plow is maintained in its normal horizontal position and not made to tip, so as to subject the pivotal bearings to a binding friction.

By attaching the pitmen to the plow itself, one to each wing, I am able not only to provide a positive oscillating movement of the wings, but relieve the pivot of all extra strain on account of such movements.

What I claim as new, and desire to secure by Letters Patent, is—

1. In a potato-digger, the combination with a truck and truck-supported plow-beam, of a two-winged plow superimposed upon and pivoted to the beam upon a vertical axis located intermediately of, and in approximately the same horizontal plane with, the wings, and a crank-and-pitman connection between the truck-wheels and each wing of the plow, whereby positive oscillating movements will be communicated to the pivoted plow, substantially as described.

2. In a potato-digger, the combination with a truck and truck-supported plow-beam, of a two-winged plow superimposed upon and pivoted to the beam upon a vertical axis intermediately of and in approximately the same horizontal plane with the plow-wings, operating connections between the truck-wheels and plow for oscillating the wings, and a series of rearwardly-projecting tines secured at their forward ends to the plow, substantially as described.

3. In a potato-digger, the combination with a truck and truck-supported plow-beam, of a plow pivoted upon a vertical axis, means for oscillating the plow upon its pivot, and supporting swing connections between the upper end of the plow-beam and the plow located approximately at the center of gravity of the plow, substantially as described.

4. In a potato-digger, the combination with a truck and truck-supported plow-beam, of a plow pivoted upon a vertical axis and comprising a tusk projecting forwardly of the pivot, a pair of diverging wings or shares projecting rearwardly of the pivot on opposite sides, and a plurality of rearwardly-projecting tines, supporting swing connections attached to the wings rearwardly of the pivot, a crank-operated pitman secured to each wing, and operating connections between the crank and the truck-wheels, substantially as described.

In testimony whereof I have hereunto set my hand this 22d day of December, 1896.

JAMES A BUCK.

Witnesses:
GEO. A. MOSHER,
FRANK C. CURTIS.